United States Patent
Ueda et al.

(10) Patent No.: US 8,820,377 B2
(45) Date of Patent: Sep. 2, 2014

(54) PNEUMATIC RADIAL TIRE

(75) Inventors: Yoshio Ueda, Hiratsuka (JP); Yoshiki Kanehira, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/126,795

(22) PCT Filed: Jun. 12, 2012

(86) PCT No.: PCT/JP2012/003813
§ 371 (c)(1),
(2), (4) Date: Dec. 16, 2013

(87) PCT Pub. No.: WO2012/172778
PCT Pub. Date: Dec. 20, 2012

(65) Prior Publication Data
US 2014/0116587 A1   May 1, 2014

(30) Foreign Application Priority Data
Jun. 17, 2011 (JP) .................. 2011-135381
Jun. 17, 2011 (JP) .................. 2011-135383

(51) Int. Cl.
*B60C 9/22* (2006.01)
*B60C 9/00* (2006.01)
*B60C 9/18* (2006.01)
*B60C 9/20* (2006.01)

(52) U.S. Cl.
CPC ............. *B60C 9/0007* (2013.04); *B60C 9/0064* (2013.04); *B60C 2009/2074* (2013.04); *B60C 2009/2077* (2013.04); *B60C 9/18* (2013.01); *B60C 2009/2048* (2013.04); *B60C 9/2006* (2013.04); *B60C 2009/2083* (2013.04); *B60C 9/22* (2013.01)
USPC ........ 152/527; 152/209.1; 152/451; 152/526; 152/535

(58) Field of Classification Search
CPC ...... B60C 9/00; B60C 9/0007; B60C 9/0057; B60C 9/0064; B60C 2009/0085; B60C 2009/0092; D07B 1/06; D07B 1/08; D07B 1/10; D07B 1/0606
USPC ...................... 152/209.1, 451, 526, 527, 535; 428/397–401; 57/902
See application file for complete search history.

(56) References Cited

U.S. PATENT DOCUMENTS 3,402,546 A * 9/1968 Peene .............................. 57/236
3,613,763 A * 10/1971 Fletcher ........................ 152/527
(Continued)

FOREIGN PATENT DOCUMENTS

JP   H06-255313 A   9/1994
JP   H07-001915 A   1/1995
(Continued)

OTHER PUBLICATIONS

International Search Report in PCT/JP2012/003813 dated Sep. 4, 2012.

*Primary Examiner* — Eric Hug
(74) *Attorney, Agent, or Firm* — Global IP Counselors, LLP (57) ABSTRACT

Each of belt layers of a pneumatic radial tire includes a plurality of single steel wires with an identical wire diameter extending linearly in an identical direction in alignment with each other and embedded in rubber. Each of the wires is provided with axial torsion. On the outer surface of a tread portion, circumferential grooves extend in the circumferential direction of the tire. The wire diameters of the single steel wires are 0.28 mm to 0.38 mm. An average of intervals of the single steel wires is not less than 0.10 mm. The tire has an out-of-plane bending stiffness of not less than 6000 N·mm² per inch of length of the tread portion in the circumferential direction when a force application point is located at the circumferential groove. The implanted density E (wires/50 mm) of the single steel wires satisfies $E \geq 1869 \times d^2 - 1838 \times d + 493$, where d is the wire diameter.

13 Claims, 4 Drawing Sheets

(56) References Cited

U.S. PATENT DOCUMENTS

| | | | |
|---|---|---|---|
| 5,490,551 A * | 2/1996 | Prakash et al. | 152/556 |
| 2009/0260735 A1 | 10/2009 | Sasabe et al. | |
| 2013/0206302 A1* | 8/2013 | Yasuda et al. | 152/451 |

FOREIGN PATENT DOCUMENTS

| | | | |
|---|---|---|---|
| JP | H09-039510 A | | 2/1997 |
| JP | H09-142104 A | | 6/1997 |
| JP | H11-081167 A | | 3/1999 |
| JP | 2004-204391 | * | 7/2004 |
| JP | 2006-218988 A | | 8/2006 |
| JP | 2007-015638 A | | 1/2007 |
| JP | 2007-297765 A | | 11/2007 |
| JP | 2010-089727 A | | 4/2010 |
| WO | WO 2012/002111 | * | 1/2012 |

* cited by examiner

PNEUMATIC RADIAL TIRE

CROSS-REFERENCE TO RELATED APPLICATIONS

This U.S. National stage application claims priority under 35 U.S.C. §119(a) to Japanese Patent Application No. 2011-135381, filed in Japan on Jun. 17, 2011, and to Japanese Patent Application No. 2011-135383, filed in Japan on Jun. 17, 2011, the entire contents of Japanese Patent Application Nos. 2011-135381 and 2011-135383 are hereby incorporated herein by reference.

FIELD OF THE INVENTION

The present invention relates to a pneumatic radial tire.

DESCRIPTION OF THE RELATED ART

Conventionally, steel cords composed of a plurality of intertwined filaments are used as reinforcing cords for a belt layer in a pneumatic radial tire (hereinbelow also referred to as a "tire"). However, the cord diameter of the steel cords composed of a plurality of intertwined filaments grows larger due to internal gaps formed in between the filaments. Accordingly, since a large amount of coating rubber is required, the rolling resistance of the pneumatic radial tire easily increases due to energy loss of the coating rubber.

Accordingly, the use of single steel wire as the belt layer reinforcing cord has been proposed (e.g., see Japanese Patent Laid-open No. 2006-218988 and Japanese Patent Laid-open No. 2010-89727) to reduce the amount of coating rubber used in the belt layer and reduce the rolling resistance of the pneumatic radial tire. In this case, the strength of the single steel wire needs to be sufficiently increased by a wire drawing process to sufficiently ensure a reinforcing effect by the single steel wires. However, an excessive orientation in the metallic structure of the single steel wire increases in correspondence with the wire surface being closer to the wire drawing die surface in a single steel wire subjected to wire drawing. As a result, there is a problem in that the fatigue resistance of the single steel wire deteriorates and the tire durability is reduced when single steel wires are used as-is after the wire drawing as reinforcing cords in the belt layer.

SUMMARY

An object of the present invention is to provide a pneumatic radial tire that uses a belt layer including a plurality of single steel wires aligned and embedded in rubber, wherein the pneumatic radial tire is able to demonstrate improved tire durability.

An aspect of the present invention is a pneumatic radial tire.

The pneumatic radial tire includes:
a pair of bead cores;
a carcass layer folded around each of the pair of bead cores;
a plurality of belt layers provided on an outside portion of the carcass layer in a tire radial direction, each of the belt layers including a plurality of single steel wires with an identical wire diameter extending linearly in an identical direction in alignment with each other and embedded in rubber, each of the single steel wires being provided with axial torsion; and
a tread portion provided to an outside in a tire radial direction of the belt layers, and provided with circumferential grooves that extend in a tire circumferential direction on a tire surface.

The wire diameters of the single steel wires are 0.28 mm to 0.38 mm. The average of intervals of the single steel wires is not less than 0.10 mm. The out-of-plane bending stiffness is not less than 6000 N·mm$^2$ per inch of length of the tread portion in the circumferential direction when a force application point is located at the circumferential groove.

Each of the single steel wires is preferably given an axial torsion after a wire drawing process while the wire is remained in a linear shape.

An implanted density E (wires/50 mm) of the single steel wires preferably satisfies $E \geq 1869 \times d^2 - 1838 \times d + 493$, where d is the wire diameter.

A helix angle of the axial torsion on a surface of each single steel wire with respect to an axial direction of the single steel wire is, for example, 1 to 15 degrees.

A belt cover layer is preferably wound around outside portions in the tire radial direction of the belt layers in at least a region corresponding to the circumferential groove located to an outside in a tire width direction in the pneumatic radial tire.

A ratio of the minimum thickness of the tread portion to the maximum thickness of the tread portion is preferably not less than 38%.

Furthermore, another aspect of the present invention is a pneumatic radial tire.

The pneumatic radial tire includes:
a pair of bead cores;
a carcass layer folded around each of the pair of bead cores;
a plurality of belt layers provided on an outside portion of the carcass layer in a tire radial direction, each of the belt layers including a plurality of single steel wires with an identical wire diameter extending linearly in an identical direction in alignment with each other and embedded in rubber, each of the single steel wires being provided with axial torsion; and
a tread portion provided to an outside in the tire radial direction of the belt layers and provided with circumferential grooves that extend in a tire circumferential direction on a tire surface.

The wire diameters of the single steel wires are 0.28 mm to 0.38 mm. An average of intervals of the single steel wires is not less than 0.10 mm. The implanted density E (wires/50 mm) of the single steel wires preferably satisfies $E \geq 1869 \times d^2 - 1838 \times d + 493$, where d is the wire diameter.

Each of the single steel wires is preferably given an axial torsion after a wire drawing process while the wire is remained in a linear shape.

A helix angle of the axial torsion on a surface of each single steel wire with respect to an axial direction of the single steel wire is, for example, 1 to 15 degrees.

A belt cover layer is preferably wound around outside portions in the tire radial direction of the belt layers in at least a region corresponding to a circumferential groove located to an outside in a tire width direction in the pneumatic radial tire.

Tire durability can be improved according to the pneumatic tire of the present invention.

DESCRIPTION OF EMBODIMENTS

The pneumatic radial tire of the present invention will be explained herein below. The pneumatic radial tire of the embodiment explained below is applied to, for example, a passenger vehicle tire as defined in Chapter A of the JATMA YEAR BOOK 2011, but may also be applicable to a small truck tire as defined in Chapter B or a truck and bus tire as defined in Chapter C. The pneumatic radial tire of the present embodiment discussed below is a passenger vehicle tire.

DEFINITIONS

The tire width direction is the direction parallel to the rotational axis of the pneumatic tire. The outside of the tire width direction represents the sides further away from the tire center line CL (see FIG. 1) in the two directions in the tire width direction. The tire circumferential direction is the direction that the tire tread portion rotates around the rotational axis of the pneumatic tire. The tire radial direction is the direction orthogonal to the rotational axis of the pneumatic tire. The outside in the tire radial direction is the side further away from the rotational axis. The inside in the tire radial direction is the side closer to the rotational axis.

In the present description, out-of-plane bending stiffness of the tread portion that includes circumferential grooves extending in the tire circumferential direction on the tire surface is measured as described below in compliance with JIS Z2248. First, a cut sample with a length in the circumferential direction of one inch (25.4 mm) is cut out from a pneumatic radial tire. The tire outside surface of the tread portion of the sample is supported such that the distance between supporting points is 20 mm centered on the center position in the width direction of a circumferential groove. A load is applied (pressed) from the tire inner surface side onto the tread portion. A force application point corresponds to a position of the circumferential groove on the inner surface side (side facing the cavity of the tire) of the tread portion. At this time, a strain amount Y (mm) is measured in the loading direction (pressing direction) of the tread portion when the load W (N) reaches 100 N with the loading speed (pressing speed) being 10 mm/min. The strain amount Y is measured in three locations on the tire in this way and an average is obtained. The out-of-plane bending stiffness R (N·mm$^2$) of the tread portion is calculated with the following equation (1) on the basis of the distance between the supporting points (L=20 mm), the load (W=100N), and the strain amount Y.

$$R=(L^3 \times W)/(48 \times Y) \quad (1)$$

Moreover, a helix angle θ of the axial torsion on a surface of the wire is measured as described below in the present description. First, a single steel wire is extracted from the pneumatic radial tire. The single steel wire is immersed in an organic solvent so that the rubber attached to the surface swells and is then removed. The single steel wire is observed under an optical microscope. A wire diameter d (mm) of the single steel wire is measured and a half value of a torsion pitch P (mm) is measured based on drawing marks formed on the surface of the single steel wire and then the value is multiplied by two to obtain the torsion pitch P. The torsion pitch P is an average of values measured in at least 10 locations. The helix angle θ is calculated using the following equation (2) on the basis of the wire diameter d and the torsion pitch P of the single steel wire.

$$\theta = ATAN(\sigma \times d/P) \times 180/\pi \quad (2)$$

First Embodiment

Pneumatic Radial Tire

As a result of diligent research on pneumatic radial tires including belt layers including a plurality of single steel wires aligned and embedded in rubber, the present inventor found that tire durability is noticeably improved by optimizing the wire diameter and the average interval of single steel wires provided with axial torsion and by suitably assuring the out-of-plane bending stiffness of the tread portion that envelops the belt layers to suppress buckling of the tread portion. The inventor found that the tire durability can be further improved by setting the implanted density E (wires/50 mm) of the single steel wires to a certain value or higher to suitably assure the out-of-plane bending stiffness of the tread portion that envelops the belt layers to suppress buckling of the tread portion. The present inventor made the present invention based on these findings.

Figure 1:
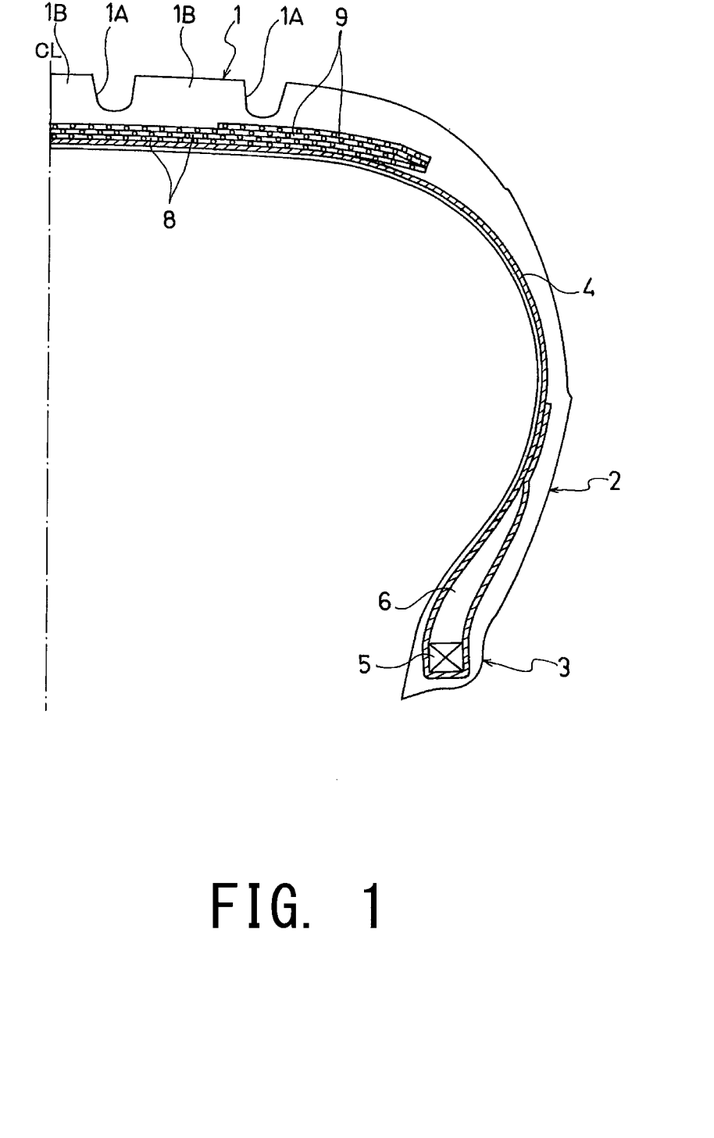
FIG. 1 is a right half cross-section view from the tire center line of a cross-section of the pneumatic radial tire that is a first embodiment.
Figure 2:
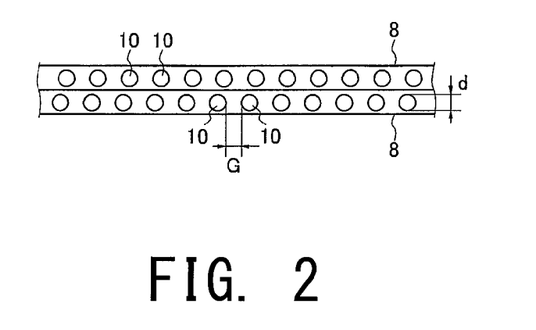
FIG. 2 is a cross-section showing an enlargement of portions of belt layers in the pneumatic radial tire shown in FIG. 1.
Figure 3:
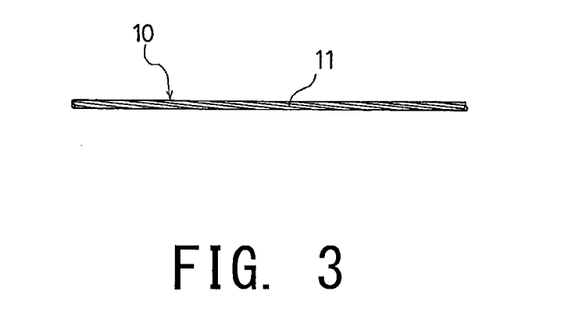
FIG. 3 is a side view of a single steel wire used in the belt layers of the present embodiment.
Figure 4:
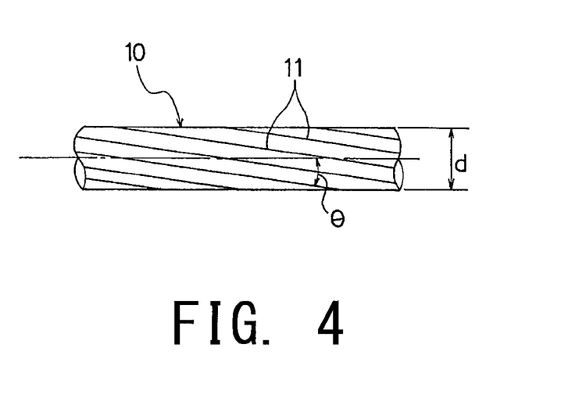
FIG. 4 is a side view showing an enlargement of a portion of the single steel wire shown in FIG. 3.

FIG. 1 shows a passenger vehicle pneumatic radial tire that is a first embodiment of the present invention. FIG. 2 shows belt layers of the pneumatic radial tire shown in FIG. 1. FIGS. 3 and 4 show a single steel wire used in the belt layers of the pneumatic radial tire of the present embodiment. The pneumatic radial tire of the present embodiment is able to demonstrate improved tire durability using belt layers including a plurality of single steel wires aligned and embedded in rubber.

In FIG. 1, the reference number 1 is a tread portion, reference number 2 is a sidewall portion, and reference number 3 is a bead portion. A carcass layer 4 is mounted between a pair of right and left bead portions 3, 3. The carcass layer 4 includes a plurality of reinforcing cords that extend in the tire radial direction. The carcass layer 4 extends from the inner side in the tire width direction to the outer side in the tire width direction to fold around a bead core 5 provided in each bead portion 3. Generally organic fiber cords are used as reinforcing cords in the carcass layer 4, but steel cords may also be used. A bead filler 6 is provided on the upper periphery of the bead core 5. The bead filler 6 is enclosed by the main portion (portion before the fold of the carcass layer 4) and the folded portion of the carcass layer 4.

Conversely, a plurality of (two or more) belt layers 8 are provided on the outer side in the tire radial direction of the carcass layer 4 at the tread portion 1. The belt layers 8 include a plurality of reinforcing cords inclined with respect to the tire circumferential direction, and the belt layers 8 are arranged so that the reinforcing cords traverse each other between the layers. An angle of inclination of the reinforcing cords with respect to the tire circumferential direction is set to be within a range of 10 degrees to 40 degrees in the belt layers 8.

At least one belt cover layer 9 is provided on the outer side in the tire radial direction of the belt layers 8. The cover layer 9 includes reinforcing cords arranged at a cord angle of degrees or less with respect to the tire circumferential direction for improving high speed durability of the tire. The belt cover layer 9 preferably has a jointless structure in which a strip member having aligned therein at least one reinforcing cord covered in rubber is continuously wound in a spiral manner. The belt cover layer 9 may be disposed as shown in FIG. 1 to cover the entire region of the belt layers 8 in the tire width direction, or alternatively, may be arranged to cover a region including an edge portion of the belt layers 8 in the tire width direction. Cords using an organic fiber such as nylon, PET, aramid and the like singly or in a composite manner may be used as the reinforcing cords of the belt cover layer 9.

A plurality of circumferential grooves 1A (a total of four in the tread portion in FIG. 1) that extend linearly along the tire circumferential direction is formed in the tread portion 1. A plurality of land portions 1B are partitioned by the plurality of circumferential grooves 1A. Consequently, the thickness of the tread portion 1 is smallest at the portions at the bottom of the circumferential grooves 1A and greatest at the portions where the land portions 1B are present. A variety of types of grooves and sipes including lateral grooves that extend in the tire width direction may be provided in addition to the circumferential grooves 1A in the tread portion 1.

Single steel wires 10 (see FIGS. 3 and 4) provided with axial torsion are used as reinforcing cords that constitute the belt layers 8 in the above pneumatic radial tire. The plurality of single steel wires 10 used in the belt layers 8 each have a circular cross-section and the same wire diameter d, and extend in a linear manner.

One single steel wire 10 is shown in FIGS. 3 and 4. Wire drawing marks 11 caused by wire drawing are formed on the surface of the single steel wire 10. The helix angle θ of the axial torsion on a surface of the wire 10 with respect to the axial direction of the wire 10 is determined on the basis of the drawing marks 11. The helix angle θ is not less than one degree and preferably within a range of 1 to 15 degrees. Each of the plurality of single steel wires 10 is preferably provided with an axial torsion after a wire drawing process while the wire 10 is remained in a linear shape.

In the pneumatic radial tire including the belt layers 8 including the plurality of single steel wires 10 aligned and embedded in rubber as described above, an excessive orientation of the metallic structure in the single steel wire 10 caused by wire drawing can be alleviated by providing axial torsion on each single steel wire 10 to generate the helix angle θ of the axial torsion on a surface of the wire 10 with respect to the axial direction of the wire 10. As a result, the fatigue resistance of the single steel wire 10 is enhanced and tire durability is improved. Further, the rolling resistance of the pneumatic radial tire can be lowered by reducing the amount of the coating rubber of the belt layers 8 on the basis of the use of the single steel wires 10. Two adjacent layers of the belt layers 8 are intersecting layers, in other words, layers in which the extending directions of the single steel wires 10 are inclined in opposite directions between the two layers with respect to the tire circumferential direction.

The improvement effect on the fatigue resistance of the single steel wires 10 is insufficient if the helix angle θ of the axial torsion on a surface of the wire 10 is less than 1 degree. Moreover, productivity of the single steel wires 10 is reduced and manufacturing becomes complicated if the helix angle θ exceeds 15 degrees.

Each wire diameter d of the single steel wires 10 is 0.28 mm to 0.38 mm in the pneumatic radial tire of the present embodiment. The distance between the single steel wires 10 needs to be reduced to assure the overall strength of the belt layers 8 if the wire diameter d is less than 0.28 mm. As a result, tire durability is reduced since cracks develop easily when cracking occurs between the belt layers 8. Conversely, fatigue resistance of the single steel wires 10 is reduced if the wire diameter d exceeds 0.38 mm and the single steel wires 10 break more easily thus reducing tire durability.

As shown in FIG. 2, an average interval G of the single steel wires 10 is not less than 0.10 mm. Preferably, the average interval G is 0.10 mm to 0.30 mm. Separation defects of the belt layers 8 may occur if the average interval G is less than 0.10 mm. Conversely, assuring the overall strength of the belt layers 8 becomes difficult if the average interval G is greater than 0.30 mm, and the steel wires may become damaged more easily. While the single steel wires 10 are disposed with an equal interval between each wire in an aspect shown in FIG. 2, the single steel wires 10 may be disposed in bundles of two to four wires.

An out-of-plane bending stiffness is not less than 6000 N·mm$^2$ per inch of length of the tread portion 1 in the circumferential direction when the force application point is located in the circumferential groove 1A, or preferably 6000 N·mm$^2$ to 10,000 N·mm$^2$ in the above pneumatic radial tire.

Figure 5:
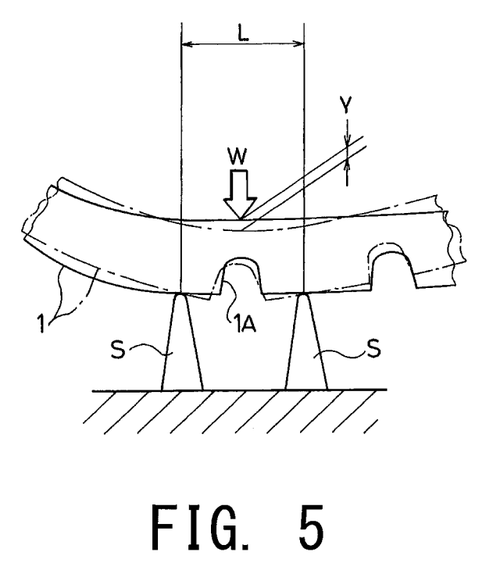
FIG. 5 describes a method for measuring out-of-plane bending stiffness of the tread portion.

As shown in FIG. 5, a cut sample having a length of one inch in the tire circumferential direction is cut out from the pneumatic radial tire. The tread surface of the cut sample is supported by a pair of support members S so that a distance between support points L that is 20 mm is centered on a middle position in the width direction of a circumferential groove 1A. A load is applied (pressed) from the tire inner surface side (side facing the cavity region of the tire) in the tread portion. The force application point corresponds to the position of the circumferential groove 1A on the rear side of the tread portion. At this time, the strain amount Y of the tread portion 1 is measured when the load W reaches 100N. The out-of-plane bending stiffness R of the tread portion 1 calculated from the above equation (1) on the basis of the distance between support points L, the load W, and the strain amount Y, is set to be not less than 6000 N·mm$^2$, or preferably 6000 N·mm$^2$ to 10,000 N·mm$^2$. The out-of-plane bending stiffness of the tread portion 1 can be suitably controlled on the basis of, for example, the wire diameter d and the average interval G of the single steel wires 10 used in the belt layers 8, the disposition and structure of the belt cover layer 9, the thickness of the tread portion 1, and the depth of the circumferential grooves 1A.

By setting the out-of-plane bending stiffness of the tread portion 1 as a relatively high value in this way, buckling of the tread portion 1 around the circumferential groove 1A in the tire radial direction is suppressed and damage to the single steel wires 10 can be prevented. As a result, the pneumatic radial tire of the present embodiment is able to demonstrate improved tire durability when belt layers 8 including a plurality of single steel wires 10 aligned and embedded in rubber are provided.

Furthermore, the implanted density E (wires/50 mm) of the single steel wire 10 in the pneumatic radial tire of the present embodiment is preferably set as a relation of $E \geq 1869 \times d^2 - 1838 \times d + 493$, where d is the wire diameter.

Figure 6:
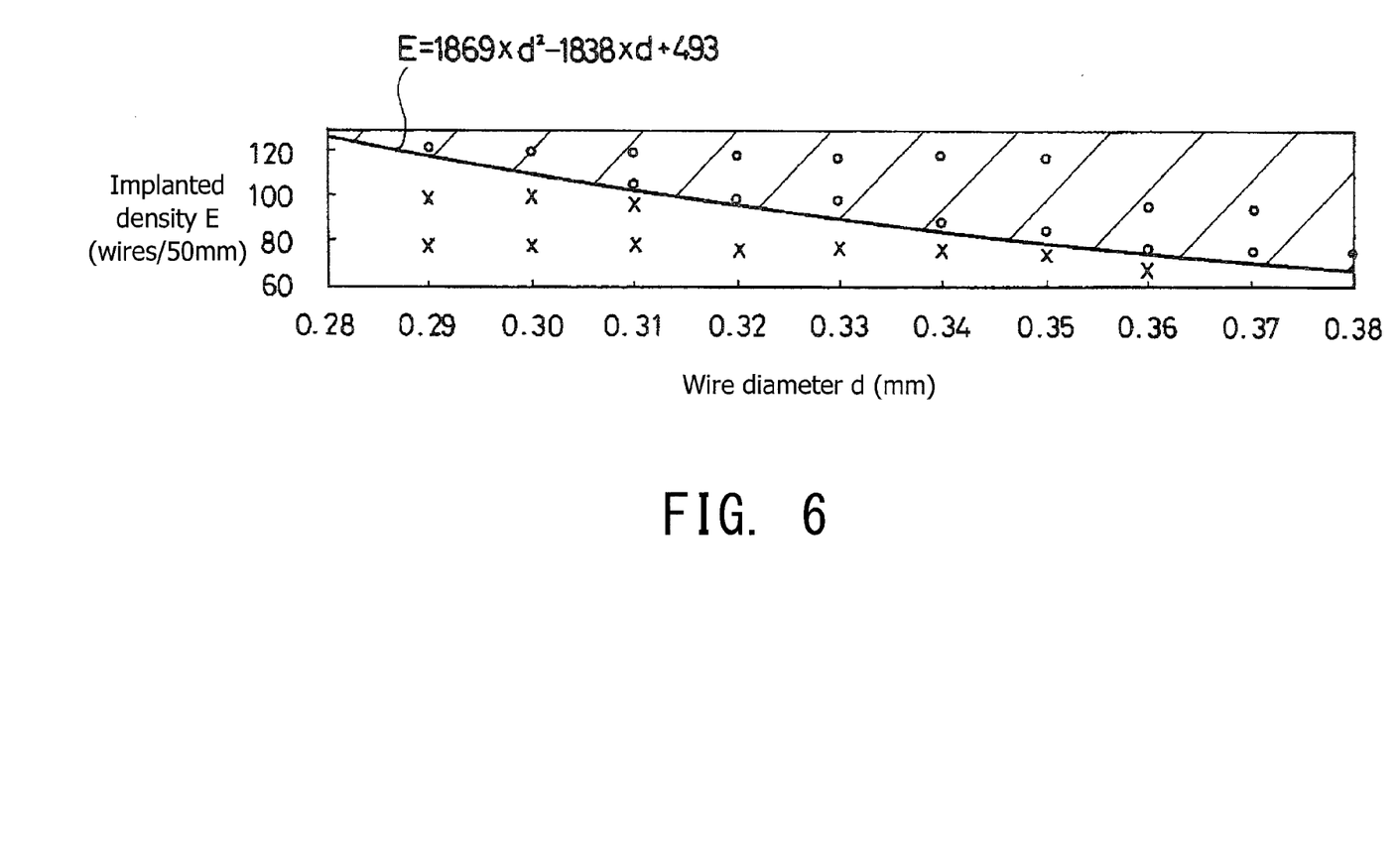
FIG. 6 is a graph showing a relationship between the wire diameter d and the implanted density E of single steel wires.

When the wire diameter d of the single steel wires 10 is set as 0.28 mm to 0.38 mm and the average interval G of the single steel wires 10 is not less than 0.10 mm, results as shown in FIG. 6 were obtained when testing of tire durability was conducted with various different values for the implanted density E per 50 mm and the wire diameter d of the single steel wires 10 as described below. In FIG. 6, the horizontal axis is the wire diameter d and the vertical axis is the implanted density E. The "○" indicates an example in which desirable tire durability is confirmed, and the "x" indicates an example in which tire durability is insufficient. As shown in FIG. 6, the wire diameter d and the implanted density E is preferably satisfy the relation of $E \geq 1869 \times d^2 - 1838 \times d + 493$ from the point of view of favorable tire durability.

In-plane bending stiffness of the tread portion 1 can be increased by satisfying the above relation with respect to the implanted density E and the wire diameter d of the single steel wires 10. Consequently, buckling of the tread portion 1 around the circumferential groove 1A is suppressed and damage to the single steel wires 10 can be prevented. As a result, the pneumatic radial tire of the present embodiment is able to demonstrate improved tire durability when belt layers 8 including a plurality of the single steel wires 10 aligned and embedded in rubber are provided.

The belt cover layer 9 may be provided to the outside in the tire radial direction of the belt layers 8 in at least a region corresponding to the circumferential groove 1A located to the outside in the tire width direction as shown in FIG. 1 in the pneumatic radial tire of the present embodiment. The above region is a portion that includes either edge of the belt layers 8 in the tire width direction. More desirably, the number of layers of the belt cover layer 9 in the region corresponding to the circumferential groove 1A located to the outside in the tire width direction among the plurality of circumferential grooves 1A is preferably set to be greater than the number of layers of the belt cover layer 9 in the region toward the center. As a result, the thickness of the tread portion 1 at the location of the circumferential groove 1A located to the outside in the tire width direction is larger than normal and the out-of-plane bending stiffness of the tread portion 1 is increased so that buckling of the tread portion 1 around the location of the circumferential groove 1A located to the outside in the tire width direction is effectively suppressed.

The ratio of the minimum thickness of the tread portion 1 to the maximum thickness of the tread portion 1 is preferably not less than 38%.

Consequently, the difference between the out-of-plane bending stiffness of the portion of the circumferential groove 1A in which the thickness of the tread portion 1 is the smallest, and the out-of-plane bending stiffness of the portion of the land portion 1B in which the thickness of the tread portion 1 is the greatest are made smaller and buckling of the tread portion 1 can be effectively suppressed. The effect of suppressing the buckling of the tread portion 1 is reduced if the above ratio is less than 38%.

The above pneumatic radial tire of the present embodiment is summarized as described below.

An excessive orientation of the metallic structure caused by the wire drawing process can be alleviated in the single steel wire 10 by providing torsion to the single steel wire 10 when using single steel wires as reinforcing cords in belt layers. Consequently, fatigue resistance of the single steel wires 10 can be improved.

Damage to the single steel wires 10 can be prevented by making the wire diameter d of the single steel wire 10 relatively small, and separation defects of the belt layers can be prevented by assuring a sufficient average interval G between the single steel wires 10.

By setting the out-of-plane bending stiffness of the tread portion as a relatively high value, buckling of the tread portion with the circumferential groove as the folding point is suppressed and damage to the single steel wires can be prevented. As a result, the pneumatic radial tire of the present embodiment is able to demonstrate improved tire durability when belt layers 8 including a plurality of single steel wires 10 aligned and embedded in rubber are provided.

Moreover, by setting the implanted density E of the single steel wire 10 as E≥1869×d²−1838×d+493, where d is the wire diameter, to increase the in-plane bending stiffness of the tread portion in the pneumatic radial tire of the present embodiment, buckling of the tread portion with the circumferential groove 1A as the folding point is suppressed and damage to the single steel wires 10 can be prevented. As a result, the pneumatic radial tire of the present embodiment is able to demonstrate improved tire durability when belt layers 8 including a plurality of single steel wires 10 aligned and embedded in rubber are provided.

While the above helix angle of the axial torsion on a surface of the single steel wire 10 is preferably large in order to improve fatigue resistance of the wire 10, an excessive amount of the helix angle leads to a drop in productivity of the single steel wires 10 thus making manufacturing difficult. Thus the helix angle of the axial torsion on a surface of the single steel wire 10 with respect to the axial direction of the wire 10 is preferably 1 to 15 degrees.

The belt cover layer 9 is preferably wound around outside portions in the tire radial direction of the belt layers 8 in at least a region corresponding to the circumferential groove located to the outside in the tire width direction in the pneumatic radial tire. As a result, the thickness of the tread portion at the location of the circumferential groove located to the outside in the tire width direction is larger than normal and the out-of-plane bending stiffness of the tread portion is increased so that buckling of the tread portion with the circumferential groove located to the outside in the tire width direction as the folding point can be effectively suppressed. In particular, the ratio of the minimum thickness of the tread portion to the maximum thickness of the tread portion is preferably not less than 38% in order to effectively suppress buckling in the tread portion.

Second Embodiment

Pneumatic Radial Tire

The passenger vehicle pneumatic radial tire that is the second embodiment has the structure shown in FIG. 1 in the same way as the passenger vehicle pneumatic radial tire that is the first embodiment.

A difference between the structure of pneumatic radial tire of the second embodiment and that of the pneumatic radial tire of the first embodiment is that whereas the out-of-plane bending stiffness is not less than 6000 N·mm² per inch of length of the tread portion in the circumferential direction when the point where the force is applied is located at the circumferential groove in the first embodiment, the implanted density E (wires/50 mm) of the single steel wires 10 in the second embodiment satisfies E≥1869×d²−1838×d+493, where d is the wire diameter. Other than the above, the structure of the pneumatic radial tire of the second embodiment is the same as the structure of the pneumatic radial tire of the first embodiment. Specifically, in the pneumatic radial tire of the second embodiment, the wire diameter d of the single steel wires 10 provided with axial torsion is 0.28 to 0.38 mm, the average interval G of the single steel wires 10 is not less than 0.10 mm, or preferably 0.10 mm to 0.30 mm, and the implanted density E (wires/50 mm) of the single steel wires 10 satisfies E≥1869×d²−1838×d+493, where d is the wire diameter.

The distance between the single steel wires 10 is reduced to assure the overall strength of the belt layers 8 if the wire diameter d of the single steel wires 10 is less than 0.28 mm, thus reducing tire durability. Conversely, fatigue resistance of the single steel wires 10 is reduced if the wire diameter d exceeds 0.38 mm, thus reducing tire durability.

Separation defects of the belt layers 8 may occur if the average interval G of the single steel wires 10 is less than 0.10 mm. Conversely, assuring the overall strength of the belt layers 8 becomes difficult if the average interval G is greater than 0.30 mm.

As described in the first embodiment, when the wire diameter d of the single steel wires 10 is set as 0.28 mm to 0.38 mm and the average interval G of the single steel wires 10 is not less than 0.10 mm, results as shown in FIG. 6 were obtained when testing of tire durability was conducted with various different values for the implanted density E per 50 mm and the wire diameter d of the single steel wires 10 as described below. In FIG. 6, the horizontal axis is the wire diameter d and the vertical axis is the implanted density E. The "○" indicates a row in which desirable tire durability is confirmed, and the "x" indicates a row in which tire durability is insufficient. As shown in FIG. 6, the wire diameter d and the implanted density E is preferably satisfy the relation of $E \geq 1869 \times d^2 - 1838 \times d + 493$ from the point of view of favorable tire durability.

The above pneumatic radial tire of the second embodiment is summarized as described below.

Specifically, in the same way as the first embodiment, since the single steel wires 10 is provided with axial torsion, an excessive orientation of the metallic structure caused by the wire drawing process is alleviated in the single steel wires 10. As a result, the fatigue resistance of the single steel wires 10 is enhanced and tire durability performance is improved. Further, the rolling resistance of the pneumatic radial tire can be reduced by reducing the amount of the coating rubber of the belt layers 8 on the basis of the use of the single steel wires 10.

In the pneumatic radial tire of the second embodiment, the wire diameter d of the single steel wires 10 is 0.28 to 0.38 mm, the average interval G of the single steel wires 10 is not less than 0.10 mm, or preferably 0.10 mm to 0.30 mm, and the implanted density E (wires/50 mm) of the single steel wires 10 satisfies $E \geq 1869 \times d^2 - 1838 \times d + 493$, where d is the wire diameter. As a result, the in-plane bending stiffness of the tread portion 1 can be increased. Consequently, buckling of the tread portion 1 around the circumferential groove 1A in the tire radial direction is suppressed and damage to the single steel wires 10 can be prevented. As a result, the pneumatic radial tire of the present embodiment is able to demonstrate improved tire durability performance when the belt layers 8 including a plurality of single steel wires 10 aligned and embedded in rubber are provided.

The single steel wires 10 are preferably given an axial torsion after a wire drawing process while the wire is remained in a linear shape in the pneumatic radial tire of the second embodiment.

Moreover, at least two adjacently stacked layers of the belt layers 8 form intersecting layers in which the directions of the single steel wires 10 are inclined in opposite directions between the two layers with respect to the tire circumferential direction.

The helix angle of the axial torsion on a surface of the single steel wire 10 with respect to the axial direction of the wire 10 is preferably 1 to 15 degrees in the pneumatic radial tire of the second embodiment. The improvement effect on the fatigue resistance of the single steel wires 10 is insufficient if the helix angle θ of the single steel wires 10 is less than 1 degree. On the other hand, productivity of the single steel wires 10 is reduced and manufacturing becomes complicated if the helix angle θ exceeds 15 degrees.

A belt cover layer 9 is preferably wound around outside portions in the tire radial direction of the belt layer 8 in at least a region corresponding to the circumferential groove located to the outside in the tire width direction in the pneumatic radial tire of the second embodiment. As a result, the thickness of the tread portion at the location of the circumferential groove located to the outside in the tire width direction is larger than normal and the out-of-plane bending stiffness of the tread portion is increased so that buckling of the tread portion with the folding point as the circumferential groove to the outside in the tire width direction can be effectively suppressed. As a result, damage to the single steel wires 10 due to buckling can be suppressed.

Working Examples

Pneumatic radial tires with the tire size of 195/65R15 were manufactured. The manufactured pneumatic radial tires include two belt layers 8 including the plurality of single steel wires 10 aligned with each other and embedded in rubber, the belt layers 8 disposed on the outside in the tire radial direction of the carcass layer at the tread portion, and the belt cover layer 9 provided on the outside in the tire radial direction of the belt layers 8. Tire 1 to tire 15 were manufactured having the wire diameter d, the helix angle θ of the axial torsion on a surface of the wire, the implanted density E, and the average interval G of the single steel wires 19 of the belt layer 8, the out-of-plane bending stiffness per one inch in length of the tread portion in the circumferential direction where the force application point is located at the circumferential groove, and the maximum value of the thickness of the tread portion, the minimum value of the thickness of the tread portion, and the ratio (%) of the minimum value to the maximum value set in tables 1 to 4.

Tires 3, 5, 7, 12 to 14, 16, and 17 were manufactured having the wire diameter d, the helix angle θ of the axial torsion on a surface of the wire, the implanted density E, and the average interval G of the single steel wires of the belt layer, and the required value $(1869 \times d^2 - 1838 \times d + 493)$ of the implanted density E as set in table 5. The tires in tables 1 to 4 and table 5 with the same numbers have the same specifications.

In tires 1 to 17, the width of the belt layer on the inside of the tire radial direction is 155 mm and the cord angle is 21 degrees, and the width of the belt layer on the outside in the tire radial direction is 145 mm and the cord angle is 21 degrees. The belt cover layer is formed by continuously winding in a spiral manner in the tire circumferential direction a strip member composed of nylon fiber cords (940 dtex/2) aligned with each other with an implanted density of 70 cords per 50 mm and coated with rubber to a thickness of 0.80 mm. The thickness of the tread portion is adjusted by adjusting the amount of winding of the strip member according to the location in the tire width direction.

Tire durability of the tires 1 to 17 was evaluated with the following evaluation method and the results are shown in the tables 1 to 5.

(Tire Durability)

The tires were mounted onto rims with a size of 15×6J and inflated to an internal pressure of 170 kPa. A running test of 300 km was conducted at a speed of 25 km/h on a drum with a diameter of 1707 mm while varying the load and slip angle in a rectangular wave. The load was set to 3.2±2.1 kN, the slip angle was set to 0±5 degrees, and the frequency of the rectangular wave variation was set at 0.067 Hz. After running for 300 km, the tires were dissected to investigate the presence or absence of damage to the single steel wires that make up the belt layer and to measure the length (maximum value) of separation caused in the belt layer. A separation length of not more than 5 mm is desirable.

Table 1 shows the evaluation results and specifications of the tire 6 and the tires 1 to 5 in which the wire diameter d of the single steel wires is changed. The average intervals G were changed in the tires 1 to 5 so that the out-of-plane bending stiffness would be substantially uniform at 7000 N·mm². The tire 6 has the same structure as the tire 3 except that tire 6 uses single steel wires without axial torsion (the helix angle is 0 degrees).

TABLE 1

|  |  | Tire 1 | Tire 2 | Tire 3 | Tire 4 | Tire 5 | Tire 6 |
|---|---|---|---|---|---|---|---|
| Single steel wire in belt layer | Wire diameter d (mm) | 0.26 | 0.28 | 0.29 | 0.38 | 0.40 | 0.29 |
|  | Wire surface torsion angle (deg) | 10 | 10 | 10 | 10 | 10 | 0 |
|  | Implanted density E (wires/50 mm) | 150 | 130 | 122 | 90 | 62 | 122 |
|  | Average interval G (mm) | 0.07 | 0.10 | 0.12 | 0.38 | 0.41 | 0.12 |
| Out-of-plane bending stiffness in tread portion (N·mm²) |  | 7000 | 7000 | 7000 | 7000 | 7000 | 7000 |
| Tread portion thickness | Minimum value (mm) | 5.8 | 5.8 | 5.8 | 5.8 | 5.8 | 5.8 |
|  | Maximum value (mm) | 15.7 | 15.7 | 15.7 | 15.7 | 15.7 | 15.7 |
|  | Min/Max (%) | 36.9 | 36.9 | 36.9 | 36.9 | 36.9 | 36.9 |
| Tire Durability | Steel wire damage | No | No | No | No | Yes | Yes |
|  | Separation (mm) | 8 | 5 | 4 | 3 | 3 | 6 |

Based on the tires 1 to 5 in Table 1, it can be seen that there is no damage to the steel wires and separation is suppressed by the wire diameter d being 0.28 to 0.38 mm when the average interval is not less than 0.10 mm and the out-of-plane bending stiffness is not less than 6000 N·mm². When comparing the tire 3 and the tire 6 shown in Table 1, it can be seen that there is no damage to the steel wire and separation can be suppressed by providing axial torsion to each of the single steel wires.

Table 2 shows the evaluation results and the specifications of the tire 7 and the tire 8 in which the average interval G of the single steel wires is varied while the out-of-plane bending stiffness is maintained at a substantially uniform 7000 (N·mm²), and the tire 3 (the same tire 3 as in Table 1).

TABLE 2

|  |  | Tire 7 | Tire 8 | Tire 3 |
|---|---|---|---|---|
| Single steel wire in belt layer | Wire diameter d (mm) | 0.29 | 0.29 | 0.29 |
|  | Wire surface torsion angle (deg) | 10 | 10 | 10 |
|  | Implanted density E (wires/50 mm) | 130 | 126 | 122 |
|  | Average interval G (mm) | 0.09 | 0.11 | 0.12 |
| Out-of-plane bending stiffness in tread portion (N·mm²) |  | 7000 | 7000 | 7000 |
| Tread portion thickness | Minimum value (mm) | 5.8 | 5.8 | 5.8 |
|  | Maximum value (mm) | 15.7 | 15.7 | 15.7 |
|  | Min/Max (%) | 36.9 | 36.9 | 36.9 |
| Tire Durability | Steel wire damage | No | No | No |
|  | Separation (mm) | 7 | 5 | 4 |

Based on the tires 3, 7, and 8 in Table 2, it can be seen that there is no damage to the steel wires and separation is suppressed even more than the tire 2 in Table 1 by the average interval G being not less than 0.10 mm when the wire diameter d is 0.28 mm to 0.38 mm and the out-of-plane bending stiffness is not less than 6000 N·mm².

Table 3 shows the evaluation results and specifications of the tires 9 to 11 in which the out-of-plane bending stiffness is varied while the average interval G is fixed at 0.12 mm.

TABLE 3

|  |  | Tire 9 | Tire 10 | Tire 11 |
|---|---|---|---|---|
| Single steel wire in belt layer | Wire diameter d (mm) | 0.29 | 0.31 | 0.33 |
|  | Wire surface torsion angle (deg) | 10 | 10 | 10 |
|  | Implanted density E (wires/50 mm) | 122 | 116 | 111 |
|  | Average interval G (mm) | 0.12 | 0.12 | 0.12 |
| Tread portion out-of-plane bending stiffness (N·mm²) |  | 5000 | 6000 | 7000 |
| Tread portion thickness | Minimum value (mm) | 5.1 | 5.1 | 5.1 |
|  | Maximum value (mm) | 15.0 | 15.0 | 15.0 |
|  | Min/Max (%) | 34.0 | 34.0 | 34.0 |
| Tire Durability | Steel wire damage | Yes | No | No |
|  | Separation (mm) | 6 | 5 | 4 |

Based on the tires 9, 10, and 11 in Table 3, it can be seen that there is no damage to the steel wires and separation is suppressed by the out-of-plane bending stiffness being not less than 6000 N·mm² when the average interval G is not less than 0.10 mm and the wire diameter d is 0.28 mm to 0.38 mm.

It can be seen that there is no damage to the steel wires and separation can be suppressed in the pneumatic radial tire by the axial torsion being provided to each of the single steel wires, the wire diameter d of the single steel wires 10 being 0.28 mm to 0.38 mm, the average interval G of the single steel wires 10 being not less than 0.10 mm, and the out-of-plane bending stiffness being not less than 6000 N·mm² per inch of length of the tread portion when the force application point is located at the circumferential groove 1A.

Table 4 shows the evaluation results and specifications of the tires 12 to 15.

TABLE 4

|  |  | Tire 12 | Tire 13 | Tire 14 | Tire 15 |
|---|---|---|---|---|---|
| Single steel wire in belt layer | Wire diameter d (mm) | 0.35 | 0.29 | 0.29 | 0.26 |
|  | Wire surface torsion angle (deg) | 10 | 3 | 15 | 10 |
|  | Implanted density E (wires/50 mm) | 90 | 122 | 122 | 130 |
|  | Average interval G (mm) | 0.21 | 0.12 | 0.12 | 0.12 |
| Out-of-plane bending stiffness in tread portion (N·mm²) |  | 9000 | 7000 | 7000 | 4000 |
| Tread portion thickness | Minimum value (mm) | 6.5 | 5..8 | 5.8 | 5.8 |
|  | Maximum value (mm) | 16.4 | 15.7 | 15.7 | 15.0 |
|  | Min/Max (%) | 39.6 | 36.9 | 36.9 | 38.7 |

TABLE 4-continued

|  |  | Tire 12 | Tire 13 | Tire 14 | Tire 15 |
|---|---|---|---|---|---|
| Tire Durability | Steel wire damage | No | No | No | Yes |
|  | Separation (mm) | 2 | 4 | 4 | 8 |

In the tires 12 to 14, axial torsion is provided to each of the single steel wires, the wire diameter d of the single steel wires 10 is 0.28 mm to 0.38 mm, the average interval G of the single steel wires 10 is not less than 0.10 mm, and the out-of-plane bending stiffness is not less than 6000 N·mm² per inch of length of the tread portion when the force application point is located at the circumferential groove 1A. It can be seen that there is no damage to the steel wires and separation is suppressed in the evaluation results of the tires 12 to 14. Conversely, damage to the steel wires occurred and separation increased in the tire 15 due to the wire diameter d not satisfying the range 0.28 mm to 0.38 mm.

Table 5 includes the tires 16 and 17 and the tires 3, 5, 7, and 12 to 14 shown in Tables 1 to 5, and shows required values of the implanted density E and the presence or absence of damage to the steel wires and the size of separation.

TABLE 5

|  |  | Tire 3 | Tire 12 | Tire 13 | Tire 14 | Tire 16 | Tire 7 | Tire 17 | Tire 5 |
|---|---|---|---|---|---|---|---|---|---|
| Single steel wire in belt layer | Wire diameter d (mm) | 0.29 | 0.35 | 0.29 | 0.29 | 0.29 | 0.29 | 0.26 | 0.4 |
|  | Wire surface torsion angle (deg) | 10 | 10 | 3 | 15 | 10 | 10 | 10 | 10 |
|  | Implanted density E (wires/50 mm) | 122 | 90 | 122 | 122 | 110 | 130 | 135 | 62 |
|  | Average interval G (mm) | 0.12 | 0.21 | 0.12 | 0.12 | 0.16 | 0.09 | 0.11 | 0.41 |
| Implanted density E required value (1869 × d2−1838 × d + 493) |  | 117 | 78 | 117 | 117 | 117 | 117 | 141 | 56 |
| Tire Durability | Steel wire damage | No | No | No | No | Yes | No | Yes | Yes |
|  | Separation (mm) | 4 | 2 | 4 | 4 | 6 | 7 | 8 | 3 |

Damage to the single steel wires that make up the belt layer did not occur and belt layer separation was minimal in the tires 3 and 12 to 14 after the durability performance testing was conducted under severe conditions.

Conversely, the tire durability performance deteriorated and was insufficient in the tires 5, 7, 16, and 17. In particular, damage to the single steel wires that makeup the belt layer occurred due to insufficient in-plane bending stiffness, and separation of the belt layer increased due to an increase in tread movement in the tire 16 since the implanted density E of the single steel wires was too small. In the tire 7, separation of the belt layer increased due to the average interval G of the single steel wires being too small. In the tire 17, damage to the single steel wires that make up the belt layer occurred due to insufficient in-plane bending stiffness and separation of the belt layer increased due to an increase in tread movement since the implanted density E of the single steel wires was smaller than the required value due to the wire diameters of the single steel wires being too small. In the tire 5, damage to the single steel wires that make up the belt layer occurred due to the wire diameter d of the single steel wires being too large.

The effect of the pneumatic radial tire of the present embodiments is apparent as described above.

While the pneumatic radial tire of the present invention has been described in detail up to this point, the pneumatic radial tire of the present invention is not limited to the above embodiments and it is apparent that a variety of changes and modifications can be made without departing from the scope of the present invention.

What is claimed is:

1. A pneumatic tire comprising:
a pair of bead cores;
a carcass layer folded around each of the pair of bead cores;
a plurality of belt layers provided on an outside portion of the carcass layer in a tire radial direction, each of the belt layers including a plurality of single steel wires with an identical wire diameter extending linearly in an identical direction in alignment with each other and embedded in rubber, each of the single steel wires provided with axial torsion;
a tread portion provided on outside portions in the tire radial direction of the belt layers and provided with circumferential grooves that extend in a tire circumferential direction on a tire surface; and
at least one belt cover layer wound around outside portions in the tire radial direction of the belt layers in at least a region corresponding to an outermost circumferential groove in a tire width direction of the pneumatic radial tire, the number of layers of the belt cover layer in the region being greater than the number of layers of the belt cover layer in a center region in the tire width direction;
the wire diameters of the single steel wires being 0.28 mm to 0.38 mm;
an average of intervals of the single steel wires being not less than 0.10 mm; and
an out-of-plane bending stiffness being not less than 6000 N·mm² per inch of length in the circumferential direction of the tread portion when a force application point is located at the circumferential groove.

2. The pneumatic tire according to claim 1, wherein:
each of the single steel wires is given an axial torsion after a wire drawing process while the wire is remained in a linear shape.

3. The pneumatic tire according to claim 1, wherein:
an implanted density E (wires/50 mm) of the single steel wires satisfies $E \geq 1869 \times d^2 - 1838 \times d + 493$, where d is the wire diameter.

4. The pneumatic tire according claim 1, wherein:
a helix angle of the axial torsion on a surface of each single steel wire with respect to an axial direction of the single steel wire is 1 to 15 degrees.

5. The pneumatic tire according to claim 1 wherein:
a ratio of the minimum thickness of the tread portion to the maximum thickness of the tread portion is not less than 38%.

6. The pneumatic tire according to claim 2, wherein:
an implanted density E (wires/50 mm) of the single steel wires satisfies $E \geq 1869 \times d^2 - 1838 \times d + 493$, where d is the wire diameter.

7. The pneumatic tire according to claim 2, wherein:
a helix angle of the axial torsion on a surface of each single steel wire with respect to an axial direction of the single steel wire is 1 to 15 degrees.

8. The pneumatic tire according claim 3, wherein:
a helix angle of the axial torsion on a surface of each single steel wire with respect to an axial direction of the single steel wire is 1 to 15 degrees.

9. The pneumatic tire according to claim 2 wherein:
a ratio of the minimum thickness of the tread portion to the maximum thickness of the tread portion is not less than 38%.

10. A pneumatic tire comprising:
a pair of bead cores;
a carcass layer folded around each of the pair of bead cores;
a plurality of belt layers provided on an outside portion of the carcass layer in a tire radial direction, each of the belt layers including a plurality of single steel wires with an identical wire diameter extending linearly in an identical direction in alignment with each other and embedded in rubber, each of the single steel wires provided with axial torsion;
a tread portion provided on outside portions in a tire radial direction of the belt layers and provided with circumferential grooves that extend in a tire circumferential direction on a tire surface; and
at least one belt cover layer wound around outside portions in the tire radial direction of the belt layers in at least a region corresponding to an outermost circumferential groove in a tire width direction of the pneumatic radial tire, the number of layers of the belt cover layer in the region being greater than the number of layers of the belt cover layer in a center region in the tire width direction;
the wire diameters of the single steel wires being 0.28 mm to 0.38 mm;
an average of intervals of the single steel wires being not less than 0.10 mm; and
an implanted density E (wires/50 mm) of the single steel wires satisfying $E \geq 1869 \times d^2 - 1838 \times d + 493$, where d is the wire diameter.

11. The pneumatic tire according to claim 10, wherein
each of the single steel wires is given an axial torsion after a wire drawing process while the wire is remained in a linear shape.

12. The pneumatic tire according to claim 10, wherein
a helix angle of the axial torsion on a surface of each single steel wire with respect to an axial direction of the single steel wire is 1 to 15 degrees.

13. The pneumatic tire according to claim 11, wherein
a helix angle of the axial torsion on a surface of each single steel wire with respect to an axial direction of the single steel wire is 1 to 15 degrees.

* * * * *